US012771643B2

(12) United States Patent
Griffin et al.

(10) Patent No.: US 12,771,643 B2
(45) Date of Patent: Oct. 20, 2026

(54) SUPERDENSE NETWORK LINK OPTIMISER TO ADDRESS TRAFFIC PEAKS

(71) Applicant: Red Hat, Inc., Raleigh, NC (US)

(72) Inventors: Leigh Griffin, Waterford (IE); Stephen Coady, Waterford (IE)

(73) Assignee: Red Hat, LLC, Raleigh, NC (US)

(*) Notice: Subject to any disclaimer, the term of this patent is extended or adjusted under 35 U.S.C. 154(b) by 993 days.

(21) Appl. No.: 18/073,196

(22) Filed: Dec. 1, 2022

(65) Prior Publication Data

US 2024/0187344 A1 Jun. 6, 2024

(51) Int. Cl.

| | |
|---|---|
| ***G06N 10/00*** | (2022.01) |
| ***G06N 10/40*** | (2022.01) |
| ***G06N 10/80*** | (2022.01) |
| ***H04L 47/127*** | (2022.01) |
| ***H04L 47/2408*** | (2022.01) |
| ***H04L 69/04*** | (2022.01) |

(52) U.S. Cl.

CPC ........... *H04L 47/127* (2013.01); *G06N 10/00* (2019.01); *G06N 10/40* (2022.01); *G06N 10/80* (2022.01); *H04L 47/2408* (2013.01); *H04L 69/04* (2013.01)

(58) Field of Classification Search

CPC ... H04L 47/127; H04L 47/2408; H04L 69/04; G06N 10/40; G06N 10/80; G06N 10/00

See application file for complete search history.

(56) References Cited

U.S. PATENT DOCUMENTS

| | | | | |
|---|---|---|---|---|
| 10,756,826 | B1 * | 8/2020 | Coady | H04B 10/70 |
| 11,133,823 | B2 | 9/2021 | Griffin et al. | |
| 11,360,924 | B1 | 6/2022 | Griffin et al. | |
| 2016/0197781 | A1 * | 7/2016 | Smith | H04L 5/0058 370/254 |
| 2020/0201655 | A1 * | 6/2020 | Griffin | G06F 9/4494 |
| 2021/0034411 | A1 * | 2/2021 | Griffin | G06F 1/06 |
| 2022/0269976 | A1 | 8/2022 | Wang et al. | |
| 2023/0306293 | A1 * | 9/2023 | Daimon | G06N 10/20 |
| 2024/0078457 | A1 * | 3/2024 | Stockert | H04L 41/12 |

OTHER PUBLICATIONS

Bhatia, Munish, et al., “Quantum-based predictive fog scheduler for IoT applications,” ScienceDirect, Computers in Industry 111 (2019) 51-67, DOI:10.1016/j.compind.2019.06.002, Jul. 2019, 17 pages.

Notzel, Janis, et al., “Entanglement-Enhanced Communication Networks,” 2020 IEEE International Conference on Quantum Computing and Engineering (QCE), DOI:10.1109/QCE49297.2020.00038, Oct. 2020, 7 pages.

Wu, Xiaoliang, et al., “A Scalable Quantum Key Distribution Network Testbed Using Parallel Discrete-Event Simulation,” ACM Trans. Model. Comput. Simul. 32, 2, Article 11, https://doi.org/10.1145/3490029, Feb. 2022, 22 pages.

* cited by examiner

*Primary Examiner* — Xuyang Xia

(74) *Attorney, Agent, or Firm* — Dority & Manning, P.A.

(57) ABSTRACT

An event is determined on a quantum network. A forecasted budget is determined for one or more entangled qubits for communicating at least a portion of one or more communication packets to a recipient interface over the quantum network with a superdense protocol. One or more first qubits that are respectively entangled with one or more second qubits are retrieved. Transmission of the one or more second qubits to the recipient interface is initiated.

16 Claims, 5 Drawing Sheets

SUPERDENSE NETWORK LINK OPTIMISER TO ADDRESS TRAFFIC PEAKS

BACKGROUND

Quantum computing involves the use of quantum bits, referred to herein as "qubits," which have characteristics that differ from those of classical (e.g., non-quantum) bits used in classical computing. For example, while a classical bit may be in a state of either one (1) or zero (0), a qubit may be in a "superposition" of both states simultaneously. A pair of qubits may also experience a physical phenomenon referred to as "entanglement," in which the quantum state of each qubit may not be described independently of the state of the other qubit.

SUMMARY

The examples disclosed herein relate to a quantum computing networking architecture for proactively preparing superdense communication links for optimizing quantum network performance. In one example, an example method includes determining, by a quantum computing system comprising a processor device, an event on a quantum network. The example method includes determining, by the quantum computing system and based on the event, a forecasted budget for one or more entangled qubits for communicating at least a portion of one or more communication packets to a recipient interface over the quantum network with a superdense protocol. The example method includes retrieving, by the quantum computing system and based on the forecasted budget, one or more first qubits that are respectively entangled with one or more second qubits. The example method includes initiating, by the quantum computing system, transmission of the one or more second qubits to the recipient interface.

In another example, an example quantum computing system includes a memory and a processor device coupled to the memory to determine an event on a quantum network. The example quantum computing system includes the processor device coupled to the memory to determine, based on the event, a forecasted budget for one or more entangled qubits for communicating at least a portion of one or more communication packets to a recipient interface over the quantum network with a superdense protocol. The example quantum computing system includes the processor device coupled to the memory to retrieve, based on the forecasted budget, one or more first qubits that are respectively entangled with one or more second qubits. The example quantum computing system includes the processor device coupled to the memory to initiate transmission of the one or more second qubits to the recipient interface.

In another example, an example non-transitory computer-readable storage medium includes executable instructions to cause a quantum computing system to determine an event on a quantum network. The example non-transitory computer-readable storage medium includes executable instructions to cause the quantum computing system to determine, based on the event, a forecasted budget for one or more entangled qubits for communicating at least a portion of one or more communication packets to a recipient interface over the quantum network with a superdense protocol. The example non-transitory computer-readable storage medium includes executable instructions to cause the quantum computing system to retrieve, based on the forecasted budget, one or more first qubits that are respectively entangled with one or more second qubits. The example non-transitory computer-readable storage medium includes executable instructions to cause the quantum computing system to initiate transmission of the one or more second qubits to the recipient interface.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
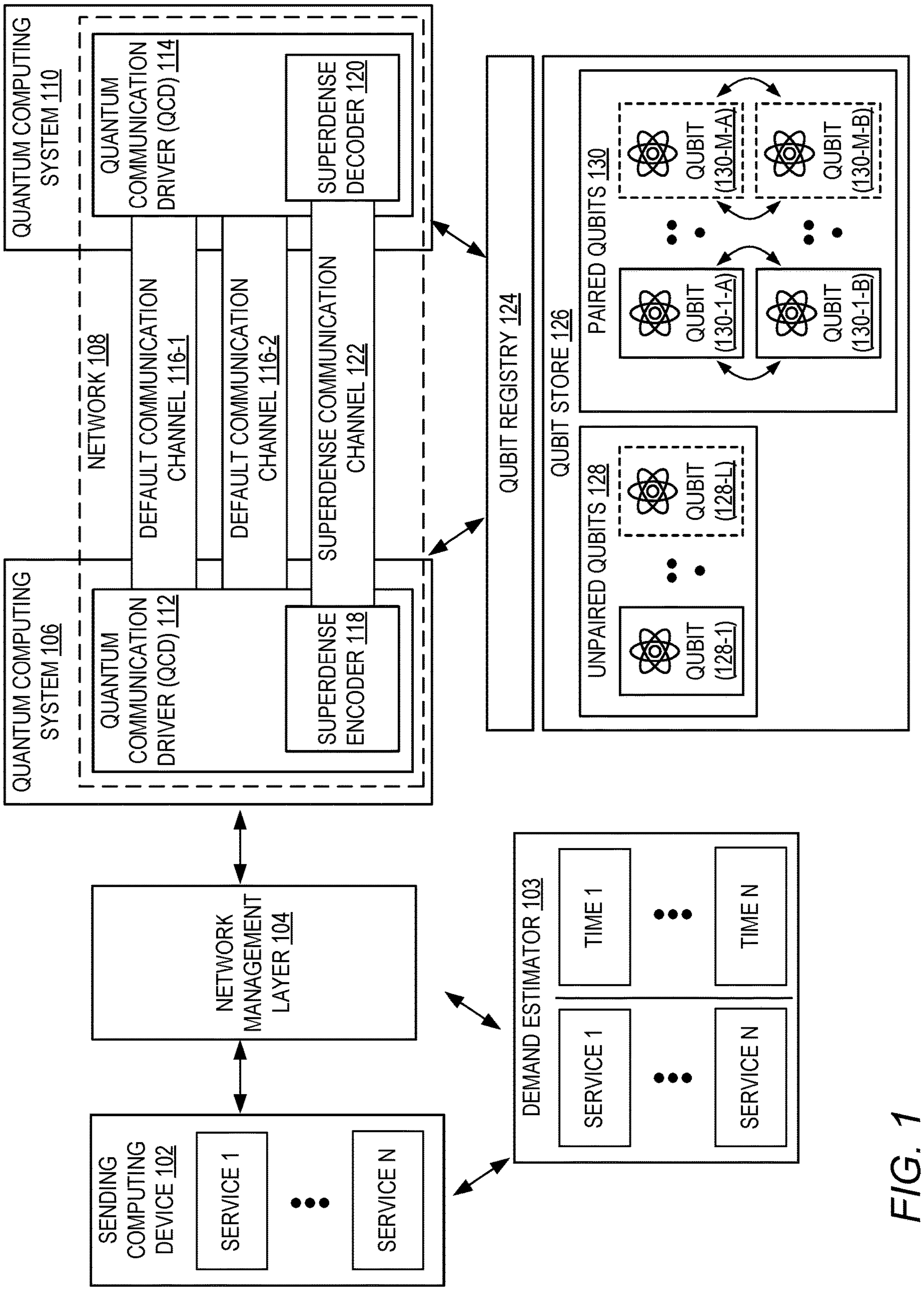
FIG. 1 depicts a system according to examples of the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Finally, it is noted that while, for purposes of illustration and simplicity, the certain aspects are illustrated as being implemented by quantum computing system that comprises a quantum computing device that in turn comprises a single quantum processor device, in practice the examples/implementations disclosed herein may be implemented in a quantum computing system that comprises any number of quantum computing devices, each of which may comprise one or more quantum processor devices. Thus, irrespective of the implementation, the examples/implementations may be implemented on a computer system that includes one or more quantum computing devices, wherein the one or more quantum computing devices comprise one or more quantum processor devices, and the one or more quantum processor devices implement functionality disclosed herein.

Quantum computing networking systems can communicate data over quantum network links. Connected computing systems can execute services that transmit data using the quantum computing networking systems. Data from the services can be encoded in qubits. Qubits can be transmitted over the quantum network links to communicate the data encoded in the qubits to a recipient system.

In some examples, quantum networking links can have limited bandwidth. Bandwidth can be limited by, for example, available qubits for transmission, available network links for utilization, processing power, etc. In some situations, superdense encoding has been used to decrease a bandwidth budget for communication of a given packet size. For instance, superdense encoding can leverage entangled qubits accessible by a recipient to communicate half as many qubits as in a non-superdense protocol. For instance, given a pair of qubits in a Bell state. One of the paired qubits can encode data and be transmitted to a recipient who has access to the other paired qubit. A predetermined entanglement between the pairing can be used to infer complementary information regarding the other entangled qubit in addition to the received transmitted qubit. But superdense coding can be expensive to implement.

Advantageously, examples according to the present disclosure can provide for proactive preparation of superdense communication channels to meet expected demands on a quantum network. For instance, a quantum computing system can provide network communication channels for one or more services. Based on prior network utilization or predicted network utilization, the quantum computing system can anticipate a demand for superdense encoding throughput. Thus, the quantum computing system can proactively retrieve and distribute entangled pairs of qubits for use in transmitting superdense encoded communications. In this manner, the quantum computing system can be ready to deploy superdense encoding when needed, advantageously providing decreased latency, reduced downtime, etc.

Example implementations are discussed herein in more detail with reference to the Figures by way of example only for the purposes of illustration.

FIG. 1 is a block diagram of an environment for implementing an example quantum computing networking system according to the present disclosure. A sending computing device 102 can execute one or multiple services (e.g., service 1, . . . , service N, etc.). The sending computing device 102 can output communication packet(s) from the service(s) for transmission over a quantum network. A demand estimator 103 can determine an expected communications demand (e.g., based on predictions/trends for service 1, . . . , service N; time 1, . . . , time N; etc.), and network management layer 104 can use the communication demand to manage and support network communications from quantum computing system 106 via network 108 to quantum computing system 110, and vice versa.

The network 108 can include a sending quantum communication driver (QCD) 112 and a receiving QCD 114. The QCDs can drive the transmission and receipt of qubits over one or more default communication channels 116-1, 116-2. The QCDs can respectively execute a superdense encoder 118 and a superdense decoder 120 to drive transmission and receipt of qubits over a superdense communication channel 122 (e.g., for reduced bandwidth usage). Transmission and receipt of qubits can occur via fiber optic cables, laser pulses, etc.

The quantum computing systems 106, 110 can access and deposit qubits as needed through a qubit registry 124 organizing a qubit store 126. Qubit store 126 can store unpaired qubits 128 (e.g., qubits 128-1 to 128-L). Unpaired qubits 128 can be used, for instance, for communicating via one or more default communication channels 116-1, 116-2. Qubit store 126 can store paired qubits 130 (e.g., paired qubits 130-1-A and 130-1-B, . . . , paired qubits 130-M-A and 130-M-B, etc.). Paired qubits 130 can be used, for instance, for communicating via the superdense communication channel 122. Network management layer 104 can use the expected communication demand to determine a qubit budget of paired qubits 130 for satisfying an expected utilization of the superdense communication channel 122.

The sending computing device 102 can be any type of computing device. The sending computing device 102 can be a quantum computing device or a classical computing device. Example computing devices are discussed with respect to FIG. 4 and FIG. 5.

The services executing on the sending computing device 102 can be any type of computing program or service. For instance, the services can be classical computing services or quantum computing services. The services can generate, relay, or receive data. The services can communicate data in packets. A data packet can include one or more bits of data for communication (e.g., classical bits, qubits, etc.).

Demand estimator 103 can estimate communications demands on network 108. Demands on network 108 can include throughput demands, latency demands, etc. For instance, demands on network 108 can be amounts of data to transmit over the network in a given amount of time. Demands on network 108 can be data rates (e.g., bitrates), such as a minimum bitrate, mean bitrate, etc. for transmitting data. For example, demands can reflect quality of service specifications, performance targets, throttling, etc.

Demand estimator 103 can estimate communications demands on network 108 based on network data. Network data can describe various metrics of network behavior (e.g., uptime, number of clients, number of data packets, etc.), network performance (e.g., throughput, data rate, latency, error rate, etc.), and the like. Network data can be mapped or otherwise correlated over time (e.g., with timestamped values of network characteristics).

Network data can describe network characteristics at various levels of granularity. Network data can describe network characteristics for all of network 108. Network data can describe network characteristics for part of network 108, such as an individual link (e.g., individual physical link) or individual communication channel (e.g., one or more default communication channels 116-1, 116-2, superdense communication channel 122).

Network data can describe network characteristics categorized by associated services outputting/receiving the communicated data. Network data can track how a given service (e.g., service 1) communicates over a network, such as network 108. For instance, network data can describe how much data service 1 outputs/receives, how quickly service 1 outputs/receives data, the time periods over which service 1 outputs/receives data, and the like.

Network data can be historical or logged network data. Historical network data can describe network characteristics of network 108 or another network. Historical network data can be observed data logged during utilization of a network. Network management layer 104 can log network data.

Sending computing device 102 can log network data. A sending interface can log network data (e.g., quantum computing system 106). A recipient interface can log network data (e.g., quantum computing system 110).

Demand estimator 103 can extract trends from network data to estimate future network demands. Demand estimator 103 can generate demand estimates from network data using a variety of techniques. Demand estimator 103 can generate demand estimates using various deterministic and probabilistic techniques.

Demand estimator 103 can generate demand estimates based on prior utilization. Demand estimator 103 can generate demand estimates based on prior network utilization of a given service. For instance, a given service can use network 108 with a set of network characteristics at a prior time, and demand estimator 103 can estimate that the given service will demand the same or similar network characteristics when executed in a present or future time. Demand estimator 103 can generate demand estimates based on prior network utilization at a given time or over a given time period. For instance, network 108 can operate with a set of network characteristics at a prior time, and demand estimator 103 can estimate that the network 108 will operate with the same or similar network characteristics when operating in a present or future time.

Demand estimator 103 can generate demand estimates by using prior demand patterns to forecast future demand patterns. For instance, demand estimator 103 can match various network characteristics of a given operational scenario to prior network characteristics in the network data, and demand estimator 103 can generate a demand estimate by referencing the demand on the network as recorded in the corresponding location in the network data.

Demand estimator 103 can generate demand estimates using machine-learned techniques. Demand estimator 103 can implement one or more machine-learned models to predict a network demand based on a set of input network characteristics (e.g., time, service identifiers, current network demand, etc.). Demand estimator 103 can implement one or more machine-learned models that have been trained based on historical network data.

Network data can be simulation data. One or more simulators can simulate the operations of services (e.g., input operations, output operations, etc.) to determine network demands during operation of the services. Simulators can input data to a service or implement instructions to cause a service to output data over a network channel. Simulators can log any simulated network activity arising during the simulated implementation of the services. Simulators can output network data of the same or similar kind as observed network data (e.g., as described above).

Demand estimator 103 can simulate the operations of services. Other components or computing systems can simulate the operations of services, such as third-party or other external computing systems.

Simulation data can describe simulated behavior of individual services or of services operating together. Simulation data can describe network characteristics for all of network 108.

Demand estimator 103 (or any simulator) can simulate any one or all of sending computing device 102, network management layer 104, quantum computing system 106, network 108, quantum computing system 110, etc. to obtain simulation data. Simulators for classical or quantum computing devices and services can include any suitable simulator for the respective simulation subjects.

Network management layer 104 can process communication packets from the sending computing device 102. Network management layer 104 can monitor network 108 for events.

An event can include a system time clock reaching a time associated with a predetermined condition or trigger. For instance, a predetermined condition can include a projected demand on network 108 at a given time. An event can occur when the given time is reached on the system clock, or when a predetermined interval until the given time is reached.

An event can include requests for communications or scheduling requests. A sending computing device 102, a quantum computing system 106, or a recipient interface can request a communication or initiate a handshake for transmitting or receiving communications, and this can trigger an event. A sending computing device 102, a quantum computing system 106, or a recipient interface can schedule a communication on the network 108, and this can trigger an event.

An event can include detection of a predetermined network characteristic, such as a network metric value reaching or passing a threshold. For instance, an event can include detecting that available network bandwidth has fallen below a threshold value.

An event can include detection of a change in a network characteristic. For instance, an event can include an increase or decrease in available network bandwidth, an increase or decrease in a number of requests on the network, an increase or decrease in a number of services operating on a sending computing device 102, an increase or decrease in a number of services scheduled to transmit data over the network 108, etc.

An event can include detection of a particular service initiating network communication or being scheduled to receive network communication. For instance, a particular service can be associated with an estimated network demand. An event can include detection of the particular service for responding to the estimated network demand.

Responsive to detected events, network management layer 104 can coordinate and instruct quantum computing system 106, quantum computing system 110, qubit registry 124, and qubit store 126 to facilitate implementation of the superdense communication channel 122.

Quantum computing system 106 or quantum computing system 110 can operate in quantum environments but can be capable of operating using classical computing principles or quantum computing principles. When using quantum computing principles, the quantum computing system 106 can perform computations that use quantum-mechanical phenomena, such as superposition and/or entanglement states. The quantum computing system 106 can operate under certain environmental conditions, such as at or near zero degrees (0°) Kelvin. When using classical computing principles, the quantum computing system 106 can use binary digits that have a value of either zero (0) or one (1).

Quantum computing system 106 or quantum computing system 110 can interact with the qubit registry 124 to obtain qubits from the qubit store 126. The qubit store 126 can be part of the quantum computing system 106. The qubit store 126 can be part of a different quantum computing system, such as quantum computing system 110. The qubit store 126 can be operated by a third party qubit provider. The qubit store 126 can communicate with quantum computing system 106 or quantum computing system 110 over a quantum network (e.g., network 108).

Quantum computing system 106 and quantum computing system 110 can operate on paired or unpaired qubits. For example, qubits 128-1, 128-L, 130-1-A&B, 130-M-A&B, etc. can each have properties that differ from those of classical (e.g., non-quantum) bits used in classical computing. Each qubit can encode quantum information for an underlying particle such as an atom or a photon and may possess characteristics that differ from those of classical (e.g., non-quantum) bits used in classical computing. For example, while a classical bit can be in a state of either one (1) or zero (0), each qubit can be in a "superposition" of both states simultaneously. Qubits can also experience a physical phenomenon referred to as "entanglement," in which the quantum state of each qubit may not be described independently of the state of another qubit. One application for the phenomenon of entanglement is quantum "teleportation" of a qubit. As used herein, teleportation refers to a process in which an entangled pair of qubits may be used to transmit quantum state information for a payload qubit (e.g., a qubit to be teleported) from one location to another, without having to transmit the payload qubit's underlying particle.

To maintain information for the qubits, the qubit registry 124 can include a plurality of qubit registry entries each corresponding to a qubit, such as unpaired qubits 128 or paired qubits 130. The qubit registry 124 can maintain and provide access to data relating to the qubits implemented by the quantum computing system 106 or the quantum computing system 110, such as a count of the total number of qubits implemented by or allocated to the quantum computing system 106 or the quantum computing system 110 and a count of the number of available qubits that are currently available for allocation ("qubit resource allocation"), as non-limiting examples.

Each of the entries of the qubit registry 124 can also store qubit metadata for a corresponding qubit. The qubit metadata can include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state. Example details concerning an example of a quantum computing system are discussed with respect to FIG. 4 and FIG. 5.

Examples discussed herein relate to network optimization using quantum communication drivers 112 and 114 configured for implementing superdense encoding. Superdense encoding can allow two classical bits of information to be transmitted from a sender to a recipient by sending only one qubit from the sender to the recipient. To use superdense encoding, the sender and the recipient each possess one qubit of a pair of entangled qubits. The sender can then encode two classical bits of information by manipulating the sender's entangled qubit (e.g., by performing a quantum gate operation such as a bit flip operation and/or a phase flip operation, as non-limiting examples), which allows the sender to prearrange the result of the recipient's measurement of the pair of entangled qubits. After the sender sends the entangled qubit to the recipient (e.g., in the form of photons transmitted via fiber optic cabling or through free space using pulsed lasers, as non-limiting examples), the recipient can then perform measurements on the pair of entangled qubits to decode the two classical bits of information.

Superdense encoding can be leveraged to decrease the number of data bits transmitted via a communications network by half, and as a result may offer benefits in terms of network optimization and bandwidth management, particularly when designing cloud-based service architectures. Superdense encoding may prove especially beneficial for services that have a sensitivity to network availability.

For instance, QCD 112 or QCD 114 can induce an entangled state between each qubit of one or more unpaired qubits 128. The one or more unpaired qubits 128 can be co-located or located in different locations. The one or more unpaired qubits 128 can be distributed to any destinations before or after being entangled in a pair. Inducing the entangled state can be performed, e.g., using Quantum Assembly (QASM) files to apply a Hadamard gate to each of one or more qubits to place them a state of superposition, and then apply a CNOT gate to each of one or more other qubits, as a non-limiting example.

Additionally, or alternatively, QCD 112 or QCD 114 can access a pre-entangled pairing from paired qubits 130. For instance, qubit store 126 can maintain a collection of paired qubits 130 that are maintained in an entangled state. Qubit registry 124 can maintain a listing of entanglement relations between qubits in the qubit store 126.

QCD 112 or QCD 114 can access qubit pairs. For instance, "A" qubits of an A/B pair (e.g., qubit 130-1-A and qubit 130-1-B) can be available to QCD 112 for manipulation by superdense encoder 118 to encode data. "B" qubits can be available to QCD 114 to, under the superdense protocol, obtain additional information via the entanglement pathway. "B" qubits can be distributed to QCD 114 from the qubit store 126 concurrently with, in advance of, or after distribution of "A" qubits to QCD 112. "B" qubits can be distributed to QCD 114 from the qubit store 126 concurrently with, in advance of, or after encoded "A" qubits are transmitted by QCD 112 via the superdense communication channel 122. QCD 112 or QCD 114 can access qubits via remote computing systems (e.g., one or more network-connected quantum computing systems can access qubits on behalf of QCD 112 or QCD 114 in lieu of distributing the qubits to QCD 112 or QCD 114).

In an example, QCD 112 can receive instructions to communicate a data packet over superdense communication channel 122. QCD 112 can cause superdense encoder 118 to encode data from the data packet into an "A" qubit of a paired set of qubits. For instance, superdense encoder 118 can transform a Bell state of the "A" qubit. After performing the superdense encoding, QCD 112 can transmit the "A" qubit to the recipient interface, QCD 114, over superdense communication channel 122. Superdense decoder 120 can leverage the entangled "B" qubit to extract the data packet that was encoded by the superdense encoder 118.

Superdense communication channel 122 can operate in parallel with one or more default communication channels 116-1, 116-2. Superdense communication channel 122 can communicate some qubits encoding a data packet for a service while one or more default communication channels 116-1, 116-2 can communicate other qubits encoding another data packet for the service.

Superdense communication channel 122 can use the same or different physical infrastructure as one or more default communication channels 116-1, 116-2. For instance, superdense communication channel 122 can use the same fiber optic cables or pulsed laser equipment as one or more default communication channels 116-1, 116-2. Superdense communication channel 122 can use different fiber optic cables or pulsed laser equipment as one or more default communication channels 116-1, 116-2.

Based on demand estimates from demand estimator 103, network management layer 104 can coordinate and instruct quantum computing system 106, quantum computing system 110, qubit registry 124, and qubit store 126 to prepare and distribute qubit pairs for implementing superdense communication channel 122. As discussed above, superdense communication protocols can use entangled "B" qubits held by or otherwise accessible to a recipient to compress more information when communicating using "A" qubits. Advantageously, based on a forecasted budget of qubits to be used to meet an expected network demand, network management layer 104 can initiate operations to proactively prepare and distribute qubit pairs.

Based on demand estimates from demand estimator 103, network management layer 104 can determine a qubit budget for satisfying the estimated demand. For instance, network management layer 104 can determine a number of qubits estimated to be sufficient to satisfy the estimated demand on the network. In particular, network management layer 104 can determine a number of qubits estimated to be sufficient to supply the number of paired qubits to be used for communicating with the superdense communication protocol.

For instance, network management layer 104 can determine a number of data bits to be transmitted according to the estimated demand. Network management layer 104 can determine a number of data bits that are to be compressed into a number of "A" qubits for transmission to a recipient interface. Based on the number of "A" qubits, the network management layer 104 can determine a number of pairs that need to be prepared for communicating that number of data bits. In this manner, for example, network management layer 104 can forecast a qubit budget for satisfying the estimated demand.

Network management layer 104 can determine a number of data bits that are to be compressed into a number of "A" qubits based on a variety of failover criteria or heuristics. For instance, network management layer 104 can determine that a given network demand will be serviced by communicating at least some portion of a communication packet using a superdense communication protocol. This determination can be based on network quality or performance targets, such as maintaining a target throughput.

Based on the forecasted qubit budget, network management layer 104 can initiate preparation of qubit pairs to build the qubit budget. Network management layer 104 can cause qubits to be paired (e.g., Bell pairs), locally or externally. Network management layer 104 can instruct quantum computing system 106, quantum computing system 110, or another quantum computing system to pair qubits. Network management layer 104 can cause paired qubits 130 to be stored in the qubit store 126.

Network management layer 104 can initiate pairing of qubits in batches or in single pairs. Network management layer 104 can initiate pairing of qubits with a ramp up of a rate of pairing.

Network management layer 104 can identify less used or underutilized network channels or links for use to distribute paired "B" qubits. Network management layer 104 can determine, for instance, that default communication channel 116-1 is operating at or near capacity while default communication channel 116-2 has underutilized bandwidth. Network management layer 104 can thus determine to distribute paired "B" qubits over default communication channel 116-2.

In identifying underutilized network channels, network management layer 104 can consider the estimated demand on the channels, including the potential use of the channels to distribute paired "B" qubits. Network management layer 104 can identify, for instance, which of the one or more default communication channels 116-1, 116-2 has sufficient available capacity to carry its existing and expected traffic as well as the paired "B" qubits for distribution.

Network management layer 104 can use estimated demands to determine when and how to distribute paired "B" qubits. Network management layer 104 can determine to prepare or distribute the paired "B" qubits during periods of low demand to prepare for periods of high demand. In this manner, for instance, network management layer 104 can improve the efficient utilization of network resources during periods of low demand.

Network management layer 104 can cause the paired "B" qubits to be prepared in advance of a period of low demand. For instance, network management layer 104 can cause paired qubits 130 to be prepared and stored in qubit store 126 during periods of high demand such that, when a period of low demand occurs, available network bandwidth can be immediately used to distribute the paired "B" qubits. Preparing paired qubits can include allocating paired qubits 130 to the network 108 in qubit registry 124.

Network management layer 104 can cause paired "B" qubits to be distributed from quantum computing system 106 to quantum computing system 110. For instance, network management layer 104 can cause quantum computing system 106 to retrieve one or more unpaired qubits 128 and pair the qubits to form paired qubits 130. This can occur locally on or externally to quantum computing system 106.

Network management layer 104 can cause paired "B" qubits to be distributed from other quantum computing systems to quantum computing system 110. For instance, network management layer 104 can cause paired "B" qubits to be distributed from an external (e.g., third-party) qubit store 126 to quantum computing system 110 to facilitate superdense communication channel 122 between quantum computing system 106 and quantum computing system 110.

In the same or similar manner as network management layer 104 can initiate the preparation of and distribution of paired qubits 130, network management layer 104 can initiate the unpairing of qubits. Network management layer 104 can determine, based on estimated network demands, that a qubit budget is operating in surplus of what is expected to satisfy the estimated demand. Network management layer 104 can initiate the unpairing of qubits (or release its allocation of paired qubits in qubit registry 124) to conserve or to more efficiently allocate the resources used to maintain paired qubits.

Network management layer 104 can adapt to the runtime environment to account for differences between the expected demand and the actual demand in the runtime environment. Network management layer 104 can initiate the preparation of additional pairs as needed if demand is higher than expected. Network management layer 104 can initiate release of qubit pairs if demand is lower than expected.

Network management layer 104 can initiate preparation and release of qubit pairs via an application programming interface (API). For instance, qubit store 126 can implement an API accessible by network management layer 104. An API call can be constructed to indicate an origin and a destination and a pair state (e.g., "pair" or "unpair"), and optionally qubit identifiers (which can be automatically assigned). Responsive to the API call, the identified qubits can be modified according to the indicated pair state.

It is to be understood that operations described as performed by a particular component, operator, or system can be performed or attributed to, within the scope of the present disclosure, in various implementations, various other components, operators, or systems. For instance, any operations described as (for the sake of illustration) performed by any one or more of the sending computing device 102, demand estimator 103, network management layer 104, network 108, QCD 112, QCD 114, superdense encoder 118, superdense decoder 120, qubit registry 124, qubit store 126, etc., can be performed by or attributed to any one or more of quantum computing system 106 or quantum computing system 110, all while remaining within the scope of the present disclosure.

Figure 2:
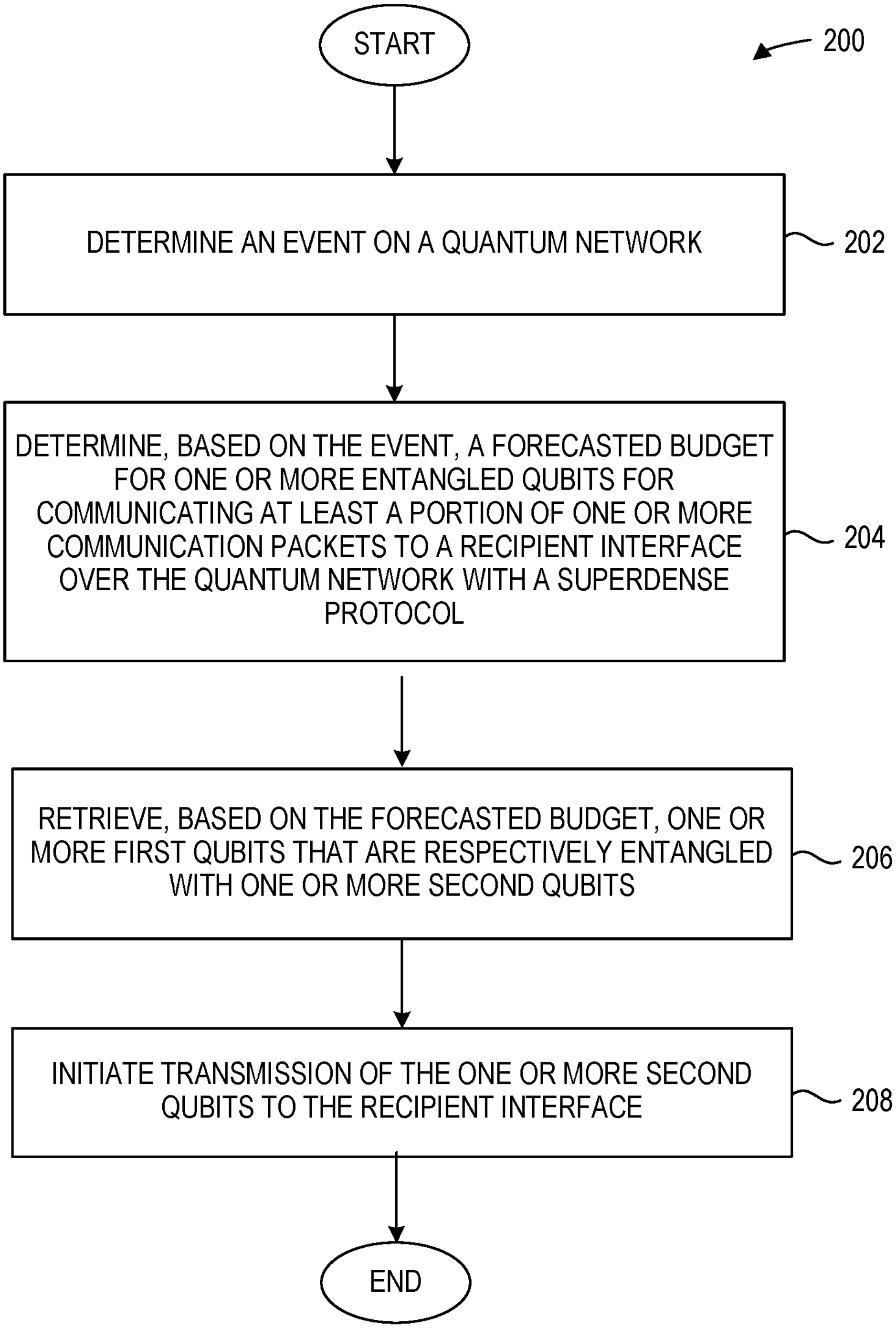
FIG. 2 depicts a flow chart of a method according to examples of the present disclosure.

FIG. 2 is a flow chart 200 of an example method according to example implementations of the present disclosure. FIG. 2 may be implemented using one or more computing devices, such as computing device 2 of FIG. 4, quantum computing device 50 of FIG. 5, etc. Elements of FIG. 1 are referenced in describing FIG. 2 for the sake of clarity. It is to be understood that, in some examples, some operations illustrated in FIG. 2 may be performed in an order other than illustrated herein, include operations not illustrated, or may be omitted.

At 202, the example method can include determining, by a quantum computing system comprising a processor device, an event on a quantum network. For example, quantum computing system 106 can implement network management layer 104 to monitor network 108 for events.

At 204, the example method can include determining, by the quantum computing system and based on the event, a forecasted budget for one or more entangled qubits for communicating at least a portion of one or more communication packets to a recipient interface over the quantum network with a superdense protocol. For example, quantum computing system 106 can implement network management layer 104 to determine a budget of paired qubits 130 expected to be sufficient to satisfy an expected demand on the network 108 for superdense encoded communications over superdense communication channel 122.

At 206, the example method can include retrieving, by the quantum computing system and based on the forecasted budget, one or more first qubits that are respectively entangled with one or more second qubits. For example, quantum computing system 106 can implement network management layer 104 to retrieve one or more paired "A" qubits from qubit store 126.

At 208, the example method can include initiating, by the quantum computing system, transmission of the one or more second qubits to the recipient interface. For example, quantum computing system 106 can implement network management layer 104 to initiate transmission (transmit or cause to be transmitted) of one or more paired "B" qubits to a recipient interface. Since the one or more paired "B" qubits are entangled with the one or more paired "A" qubits, the recipient interface can decode compressed data when "A" qubits are received that encode data according to the superdense encoding protocol.

In some implementations of the example method, determining the event can include monitoring, by the quantum computing system, a characteristic of the quantum network. In some implementations of the example method, determining the event can include detecting, by the quantum computing system, a change in the characteristic.

In some implementations of the example method, determining the event can include determining, by the quantum computing system, that a system time clock indicates a time associated with an expected network demand.

In some implementations of the example method, the example method can include estimating, by the quantum computing system, the forecasted budget based on historical network data associated with the event.

In some implementations of the example method, the example method can include determining, by the quantum computing system, one or more services associated with an expected network demand. In some implementations of the example method, the example method can include estimating, by the quantum computing system, the forecasted budget based on the determined one or more services.

In some implementations of the example method, the example method can include estimating, by the quantum computing system, the forecasted budget based on simulated network data associated with the one or more services.

In some implementations of the example method, the example method can include obtaining, by the quantum computing system, simulated network data generated by simulating operations of the one or more services.

In some implementations of the example method, determining the event can include determining, by the quantum computing system, an underutilization state for one or more communication channels of the quantum network.

In some implementations of the example method, the example method can include transmitting, by the quantum computing system, the one or more second qubits to the recipient interface via the one or more communication channels.

In some implementations of the example method, initiating the transmission can include instructing, by the quantum computing system, a third-party qubit store to transmit the one or more second qubits to the recipient interface.

Figure 3:
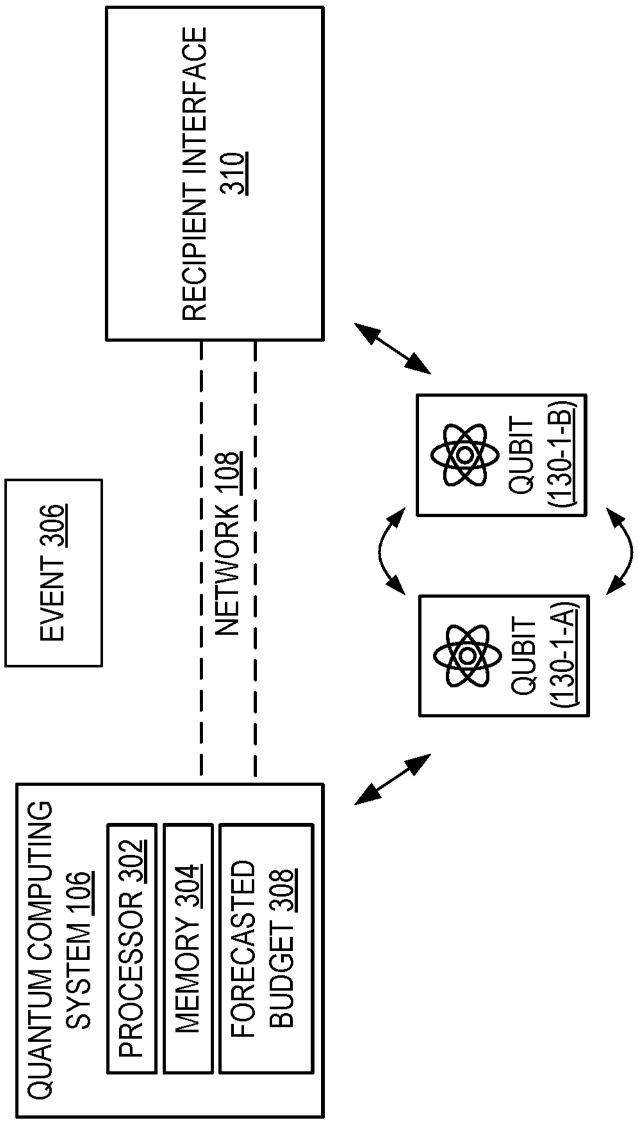
FIG. 3 depicts a system according to examples of the present disclosure.

FIG. 3 depicts a simplified diagram of a quantum computing system 106 having a processor 302 and a memory 304. The processor 302 can be communicatively coupled to memory 304 to determine an event 306 on a quantum network 108. The processor 302 can be communicatively coupled to memory 304 to determine, based on the event 306, a forecasted budget 308 for one or more entangled qubits 130-1-A, 130-1-B for communicating at least a portion of one or more communication packets to a recipient interface 310 over the quantum network 108 with a superdense protocol. The processor 302 can be communicatively coupled to memory 304 to retrieve, based on the forecasted budget 308, one or more first qubits 130-1-A that are respectively entangled with one or more second qubits 130-1-B. The processor 302 can be communicatively coupled to memory 304 to initiate transmission of the one or more second qubits 130-1-B to the recipient interface 310.

Figure 4:
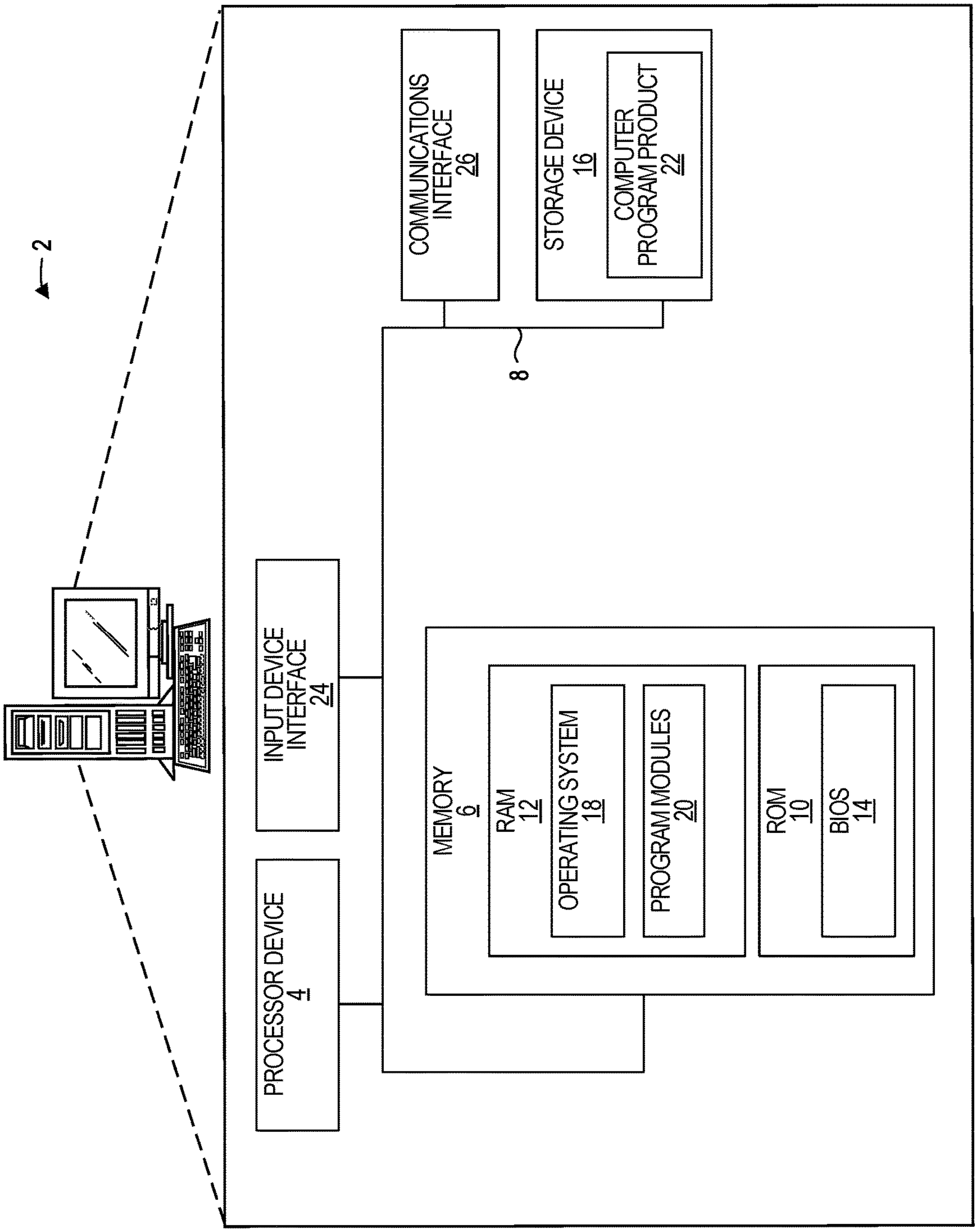
FIG. 4 depicts an example computing device to implement examples according to the present disclosure.

FIG. 4 is a block diagram of the computing device 2 suitable for implementing examples. FIG. 4 is representative of computing device 2 for purposes of illustration. FIG. 4 may also be representative of other computing devices that may be used in conjunction with examples. The computing device 2 may comprise any computing or electronic device capable of including firmware, hardware, and/or executing software instructions to implement the functionality described herein, such as a computer server, a desktop computing device, a laptop computing device, or the like. The computing device 2 includes the processor device 4, the memory 6, and a system bus 8. The system bus 8 provides an interface for system components including, but not limited to, the memory 6 and the processor device 4. The processor device 4 may be any commercially available or proprietary processor.

The memory 6 may include non-volatile memory 10 (e.g., read-only memory (ROM), erasable programmable read-only memory (EPROM), electrically erasable programmable read-only memory (EEPROM), etc.), and volatile memory 12 (e.g., random-access memory (RAM)). A basic input/output system (BIOS) 14 may be stored in the non-volatile memory 10 and may include the basic routines that help to transfer information between elements within the computing device 2. The volatile memory 12 may also include a high-speed RAM, such as static RAM, for caching data.

The computing device 2 may further include or be coupled to a non-transitory computer-readable storage medium such as the storage device 16, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 16 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A few modules may be stored in the storage device 16 and in the volatile memory 12, including an operating system 18 and one or more program modules 20 which may implement the functionality described herein in whole or in part (e.g., network management layer 104, an API for interfacing with quantum computing systems 106, 110, etc., qubit registry 124, demand estimator 103, etc.).

All or a portion of the examples may be implemented as a computer program product 22 stored on a transitory or non-transitory computer-usable or computer-readable storage medium, such as the storage device 16, which includes complex programming instructions, such as complex computer-readable program code, to cause the processor device 4 to carry out the steps described herein. Thus, the computer-readable program code may comprise software instructions for implementing the functionality of the examples described herein when executed on the processor device 4. The processor device 4, coupled to the memory 6 for implementing the instructions stored thereon, may serve as a controller, or control system, for the computing device 2 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 4 through an input device interface 24 that is coupled to the system bus 8 but may be connected by other interfaces such as a parallel port, an Institute of Electrical and Electronic Engineers (IEEE) 1394 serial port, a Universal Serial Bus (USB) port, an IR interface, and the like.

The computing device 2 may also include a communications interface 26 suitable for communicating with a network or other devices as appropriate or desired.

Figure 5:
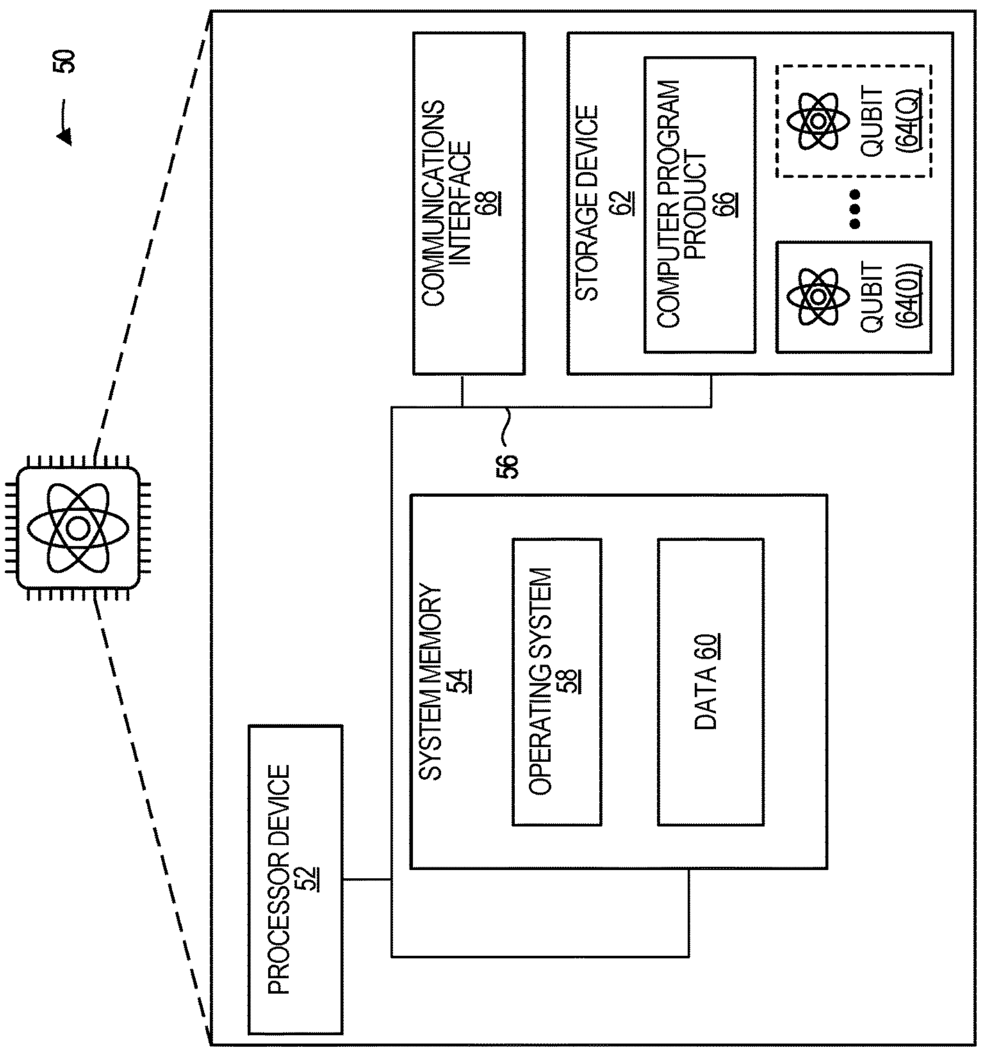
FIG. 5 depicts an example quantum computing system to implement examples according to the present disclosure.

FIG. 5 is a block diagram of a quantum computing device 50 suitable for implementing examples according to example implementations. The quantum computing device 50 may comprise any computing or electronic device capable of including firmware, hardware, and/or executing software instructions to implement the functionality described herein in a quantum environment.

The quantum computing device 50 may include one or more quantum processor device(s) 52, one or more memory device(s) 54 and/or a system bus 56. The system bus 56 provides an interface for system components including, but not limited to, the one or more memory device(s) 54 and the one or more quantum processor device(s) 52. The one or more quantum processor device(s) 52 may be any commercially available or proprietary processor suitable for operating in a quantum environment and may include a combination of quantum processors (e.g., having one or more qubits) and classical processors. The one or more memory device(s) 54 may store computer-readable instructions associated with an operating system 58. The one or more memory device(s) 54 may store computer-readable instructions for implementing examples according to the present disclosure. The one or more memory device(s) 54 may store data 60.

The quantum computing device 50 may further include or be coupled to a non-transitory computer-readable storage medium such as a storage device 62. The storage device 62 and other drives associated with computer-readable media and computer-usable media may provide non-volatile storage of data, data structures, computer-executable instructions, and the like. The storage device 62 may also store one or more qubits 64(0)-64(Q) which may be measured or manipulated by the one or more quantum processor device (s) 52 when performing quantum computing operations.

All or a portion of the examples may be implemented as a computer program product 66 stored on a transitory or non-transitory computer-usable or computer-readable storage medium, such as the storage device 62, which includes complex programming instructions, such as complex computer-readable program code, to cause the one or more processor devices 52 to carry out the functionality described herein. Thus, the computer-readable program code may comprise software instructions for implementing the functionality of the examples described herein when executed on the one or more processor devices 52.

An operator may also be able to enter one or more configuration commands through a keyboard (not illustrated), a pointing device such as a mouse (not illustrated), or a touch-sensitive surface (not illustrated). The quantum computing device 50 may also include a communications interface 68 suitable for communicating with other computing devices, including, in some implementations, classical computing devices and/or quantum computing devices.

Individuals will recognize improvements and modifications to the preferred examples of the disclosure. All such improvements and modifications are considered within the scope of the concepts disclosed herein and the claims that follow.

What is claimed is:

1. A method comprising:

determining, by a quantum computing system comprising a processor device, an event indicative of an expected network demand on a quantum network during a future time, wherein determining the event comprises:

processing, by the quantum computing system, one or more communication packets;

simulating, by the quantum computing system, operations of one or more services associated with the expected network demand to obtain simulated network data;

estimating, by the quantum computing system and based on the event and the simulated network data, a forecasted budget for one or more entangled qubits for communicating at least a portion of the one or more communication packets to a recipient interface over the quantum network with a superdense protocol, wherein estimating the forecasted budget comprises:

determining, by the quantum computing system based on the expected network demand, a number of data bits to be encoded on the one or more entangled qubits, wherein the number of data bits are associated with the at least the portion of the one or more communication packets;

retrieving, by the quantum computing system and based on the forecasted budget, one or more first qubits that are respectively entangled with one or more second qubits; and prior to the future time, initiating, by the quantum computing system, transmission of the one or more second qubits from a qubit store to the recipient interface.

2. The method of claim 1, wherein determining the event comprises:

monitoring, by the quantum computing system, a characteristic of the quantum network; and detecting, by the quantum computing system, a change in the characteristic.

3. The method of claim 1, wherein determining the event comprises:

determining, by the quantum computing system, that a system time clock indicates a time associated with the expected network demand.

4. The method of claim 1, comprising:

estimating, by the quantum computing system, the forecasted budget based on the event, the simulated network data, and historical network data associated with the event.

5. The method of claim 1, comprising:

determining, by the quantum computing system, the one or more services associated with the expected network demand.

6. The method of claim 1, wherein determining the event comprises:

determining, by the quantum computing system, an underutilization state for one or more communication channels of the quantum network.

7. The method of claim 6, comprising:

transmitting, by the quantum computing system, the one or more second qubits to the recipient interface via the one or more communication channels.

8. The method of claim 1, wherein initiating the transmission comprises:

instructing, by the quantum computing system, a third-party qubit store to transmit the one or more second qubits to the recipient interface.

9. A quantum computing system, comprising:

a memory; and a processor device coupled to the memory to:

determine an event indicative of an expected network demand on a quantum network during a future time, wherein, to determine the event, the processor device is further to:

process one or more communication packets;

simulate operations of one or more services associated with the expected network demand to obtain simulated network data;

estimate, based on the event and the simulated network data, a forecasted budget for one or more entangled qubits for communicating at least a portion of the one or more communication packets to a recipient interface over the quantum network with a superdense protocol, wherein, to estimate the forecasted budget, the processor device is further to:

determine, based on the expected network demand, a number of data bits to be encoded on the one or more entangled qubits, wherein the number of data bits are associated with the at least the portion of the one or more communication packets;

retrieve, based on the forecasted budget, one or more first qubits that are respectively entangled with one or more second qubits; and prior to the future time, initiate transmission of the one or more second qubits from a qubit store to the recipient interface.

10. The quantum computing system of claim 9, the processor device coupled to the memory to:

monitor a characteristic of the quantum network; and detect a change in the characteristic.

11. The quantum computing system of claim 9, the processor device coupled to the memory to:

determine that a system time clock indicates a time associated with the expected network demand.

12. The quantum computing system of claim 9, the processor device coupled to the memory to:

estimate the forecasted budget based on the event, the simulated network data, and historical network data associated with the event.

13. The quantum computing system of claim 9, the processor device coupled to the memory to:

determine the one or more services associated with the expected network demand.

14. The quantum computing system of claim 9, the processor device coupled to the memory to:

determine an underutilization state for one or more communication channels of the quantum network.

15. The quantum computing system of claim 14, the processor device coupled to the memory to:

transmit the one or more second qubits to the recipient interface via the one or more communication channels.

16. A non-transitory computer-readable storage medium that comprises executable instructions to cause a quantum computing system to:

determine an event indicative of an expected network demand on a quantum network during a future time, wherein, to determine the event, the executable instructions further cause the quantum computing system to:

process one or more communication packets;

simulate operations of one or more services associated with the expected network demand to obtain simulated network data;

estimate, based on the event and the simulated network data, a forecasted budget for one or more entangled qubits for communicating at least a portion of the one or more communication packets to a recipient interface over the quantum network with a superdense protocol, wherein, to estimate the forecasted budget, the executable instructions further cause the quantum computing system to:

determine, based on the expected network demand, a number of data bits to be encoded on the one or more entangled qubits, wherein the number of data bits are associated with the at least the portion of the one or more communication packets;

retrieve, based on the forecasted budget, one or more first qubits that are respectively entangled with one or more second qubits; and prior to the future time, initiate transmission of the one or more second qubits from a qubit store to the recipient interface.

* * * * *